United States Patent
Schneider et al.

(10) Patent No.: US 11,530,931 B2
(45) Date of Patent: Dec. 20, 2022

(54) SYSTEM FOR CREATING A VEHICLE SURROUNDINGS MODEL

(71) Applicant: ZF Active Safety GmbH, Koblenz (DE)

(72) Inventors: Georg Schneider, Urbar (DE); Thomas Müller, Munich (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 122 days.

(21) Appl. No.: 16/441,247

(22) Filed: Jun. 14, 2019

(65) Prior Publication Data
US 2020/0033153 A1  Jan. 30, 2020

(30) Foreign Application Priority Data
Jul. 25, 2018 (DE) .......................... 102018005869.8

(51) Int. Cl.
*G01C 21/36* (2006.01)
*G06F 17/13* (2006.01)
*G01S 19/42* (2010.01)

(52) U.S. Cl.
CPC ............ *G01C 21/367* (2013.01); *G01S 19/42* (2013.01); *G06F 17/13* (2013.01)

(58) Field of Classification Search
CPC ........ G01C 21/367; G01S 19/42; G06F 17/13
See application file for complete search history.

(56) References Cited

U.S. PATENT DOCUMENTS

| | | | |
|---|---|---|---|
| 2010/0164789 A1* | 7/2010 | Basnayake | G01S 5/0072 342/357.23 |
| 2011/0047338 A1 | 2/2011 | Stahlin et al. | |

(Continued)

FOREIGN PATENT DOCUMENTS

| | | | |
|---|---|---|---|
| DE | 102010049215 | 7/2011 | |
| DE | 102010049215 A1 * | 7/2011 | .......... B60W 40/072 |

*Primary Examiner* — Ig T An
(74) *Attorney, Agent, or Firm* — Tarolli, Sundheim, Covell & Tummino LLP

(57) ABSTRACT

System for creating a surroundings model of a motor vehicle, which is or can be connected with:
  at least one navigation unit, which is equipped to provide information about the instantaneous position of the vehicle and information about at least one segment of road in front of the vehicle in time and space, wherein the navigation unit provides the information in a digital map format and/or in absolute position information,
  at least one interface, which is equipped to communicate with at least one object to be merged in the surroundings of the vehicle, wherein the information received by the interface includes absolute position information on the at least one object to be merged, and/or
  at least one sensor unit, which is equipped to detect at least one object to be merged in the surroundings of the vehicle, wherein the at least one sensor unit is additionally equipped to provide relative position information on the at least one object to be merged relative to the vehicle,
wherein the system is equipped to ascertain the geometry of a segment of road in front of the vehicle by using the information supplied by the at least one navigation unit about the segment of road in front of the vehicle,
wherein the system is equipped to merge the absolute position information and/or the relative position information on the at least one object to be merged with information provided by the at least one navigation unit in the digital map format to create a vehicle surroundings model based on the geometry of the road thereby ascertained.

27 Claims, 14 Drawing Sheets

(56) References Cited

U.S. PATENT DOCUMENTS

| | | | |
|---|---|---|---|
| 2012/0323474 A1* | 12/2012 | Breed | G08G 1/161 |
| | | | 701/117 |
| 2017/0261995 A1* | 9/2017 | Heimberger | G06T 7/70 |
| 2017/0277716 A1 | 9/2017 | Giurgiu et al. | |
| 2017/0371349 A1 | 12/2017 | Kim et al. | |
| 2018/0149487 A1 | 5/2018 | Lee et al. | |
| 2019/0137286 A1* | 5/2019 | Mielenz | G01C 21/32 |
| 2019/0304097 A1* | 10/2019 | Eade | G01C 21/20 |

* cited by examiner

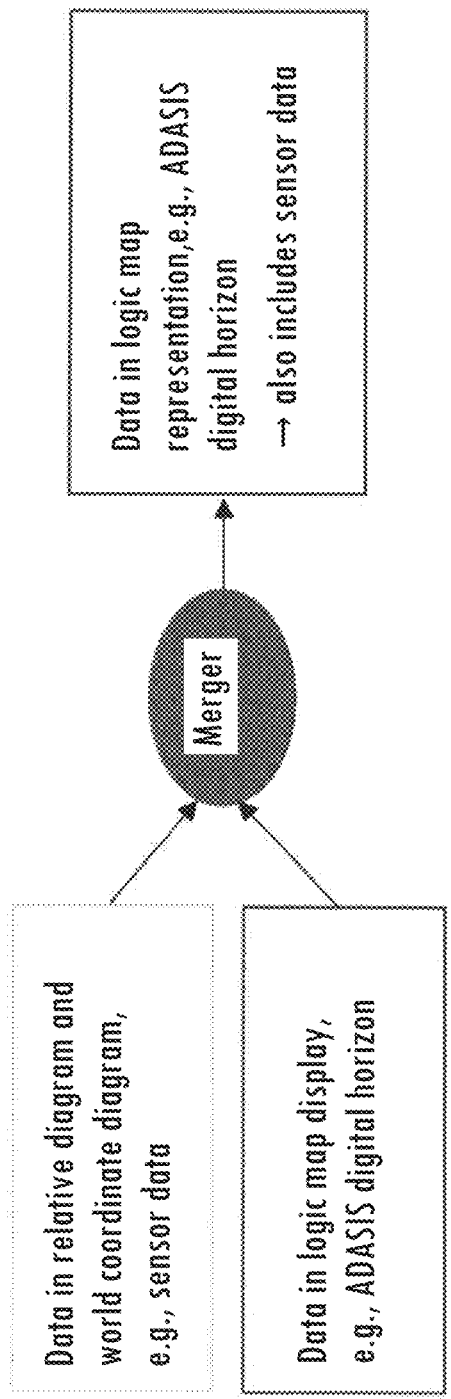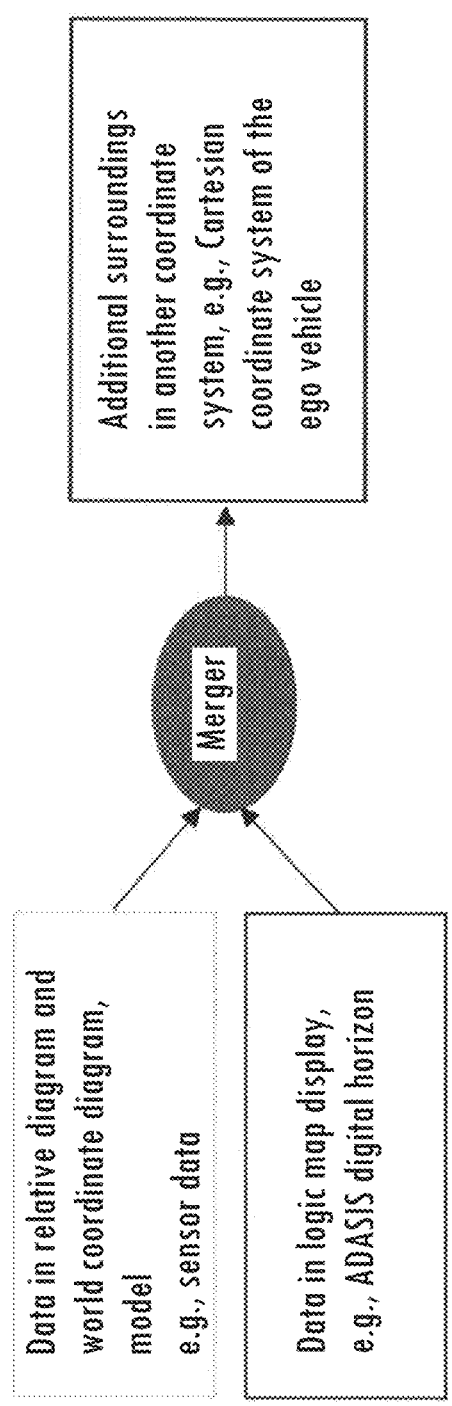

SYSTEM FOR CREATING A VEHICLE SURROUNDINGS MODEL

RELATED APPLICATION

This application claims priority from German Application No. 10 2018 005 869.8, filed Jul. 25, 2018, the subject matter of which is incorporated herein by reference in its entirety.

BACKGROUND

A method and a system are proposed here for creating a vehicle surroundings model for the surroundings of a vehicle. Various sensors and information sources are used in a vehicle in order to meet the complex demands of driver assistance systems and driverless vehicles. These sensors includes, for example, one or more cameras, radar sensors and lidar sensors. In addition, the vehicle may also receive information from the cloud or from communications with other objects. Communication between a vehicle and objects is often also referred to as "vehicle-to-everything communication" (V2X). This term refers to communication between one vehicle and the objects with which the vehicle comes in contact. This term thus includes communication of one vehicle with other vehicles, with infrastructure objects and also with humans (pedestrians). Infrastructure objects may include traffic lights, traffic signs, mobile and stationary road edge markings, buildings, signs and billboards, for example. Furthermore, information from a digital map also plays an increasingly important role as a data source. For example, information about road topology, speed limits, traffic signs and the gradient and curvature of roads can be stored in digital maps. Furthermore, there are so-called HD maps, which contain information about the course of a road and additional data with a very high precision. Furthermore, information that cannot be detected by conventional vehicle sensors can be stored in digital maps. For example, the gradient and curvature of a road can be read out from the map in order to be able to automatically adjust the driving dynamics.

PRIOR ART

DE 10 2014 111 126 A1 discloses a method for creating an environment map of the area surrounding a motor vehicle. An object in the surrounding area can be detected by means of a sensor device in/on the motor vehicle, wherein a position value describing a position of the object is determined by a control device of the motor vehicle on the basis of data from the sensor. The position value thereby ascertained is transferred to maps of the surroundings, wherein a vector between the object and a predetermined reference point of the motor vehicle is ascertained, forming a point of origin of a vehicle coordinate system. The vector determined in the vehicle coordinate system is transformed into a global coordinate system of the vehicle surroundings map and the position value in the vehicle surroundings map is determined on the basis of the transformed vector.

US 2017/371349 A1 discloses a vehicle control device comprising a communication unit. The communication unit detects location information on the vehicle and can communicate with an external server and another vehicle. A processor controls the communication unit to receive map information from the external server and receive from the other vehicle location information about the other vehicle. The processor combines the detected location information on the vehicle and the received location information on the other vehicle with the received map information in order to control the vehicle on the basis of the combined information.

Object

Against this background, the disclosure relates to the object of providing an improved system and an improved method for creating a model of the surroundings of a vehicle with which position information in different formats can be merged to create a model of the surroundings of the vehicle, regardless of the density of the available information.

Proposed Solution

A system defined in patent claim 1 for creating a model of the surroundings of a vehicle is proposed as the solution. This system for creating a model of the surroundings of a vehicle is associated with at least one navigation unit, at least one interface and/or at least one sensor unit. The at least one navigation unit is equipped to provide information about the instantaneous position of the vehicle and information about at least one segment of road in front of the vehicle in space and time, wherein the navigation unit provides the information in a digital map format and/or in absolute position information. The at least one interface is equipped to communicate with at least one object to be merged in the surroundings of the vehicle, wherein the information received by the interface comprises absolute position information on the at least one object to be merged. The at least one sensor unit is equipped to detect at least one object to be merged in the surroundings of the vehicle, wherein the at least one sensor unit is additionally equipped to provide relative position information on the at least one object to be merged relative to the vehicle. The system is equipped to ascertain the road geometry of the segment of road in front of the vehicle by using the information about the segment of road in front of the vehicle made available by the at least one navigation unit, wherein the system is equipped to merge the absolute position information and/or the relative position information on the at least one object to be merged with the information provided by the at least navigation unit in the digital map format, based on the road geometry thereby ascertained, to create a model of the surroundings of the vehicle.

In this disclosure, the information from a digital map such as, for example, the information with respect to the instantaneous position of the vehicle and information about the segment of road in front of the vehicle is referred to as information in a digital map format.

Information from the various information sources, for example, digital map in the vehicle, data from the Cloud, V2X and information from sensor units (camera, radar, etc.) can be merged. By using this merged information it is possible to create a model of the surroundings which is filled from all these sources. Driver assistance systems and systems for driverless vehicles can access this merged model of the surroundings. Using the proposed system, the information from the various information sources can be merged even if the data density is relatively low, i.e., there are relatively few objects or points with known position information on the segment of road in front of the vehicle. Since the proposed system can ascertain the geometry of the segment of road in front of the vehicle, the information itself can be merged on the basis of the road geometry thereby ascertained even if the data density for that segment of road in front of the vehicle is relatively low.

Relative position information can be provided by sensor units such as the camera unit, the radar unit and the ultrasonic sensor units, for example. Examples of such relative position information from the individual units include:

Radar unit: distance and optionally angles to with an object in front of the vehicle Camera unit: distance from traffic signs, traffic lights and pedestrians Ultrasonic sensor units: distance from vehicles on a parallel lane Absolute position information (e.g., in world coordinates) can be sent by objects such as traffic lights, traffic signs or the like, for example.

One example of an application for merging information to create a model of the surroundings of a vehicle could be a traffic light as an object to be merged. The traffic light is detected by the sensor unit, for example, by a camera unit. The traffic light sends its position in absolute position information (e.g., in world coordinates) to the system via the interface. The information can be merged in the two cases which follow, for example, to create a uniform model of the surroundings:

1. The traffic light is listed in the model of the surroundings of the vehicle, and the object to be merged, i.e., the traffic light, which is detected by the sensor unit, should be correctly associated with the existing object in the model of the surroundings.
2. The object detected is not present in the model of the surroundings and should be inserted by merger of the information from the individual information sources into the model of the surroundings.

The system can be equipped to transform the relative or absolute position information of the object to be merged in a digital map format. Accordingly, a surroundings model can be created which is based on information in a digital map format. Additionally or alternatively, the system may be equipped to transform the relative or absolute position information on the object to be merged and the information in a digital map format into a predefined coordinate format. It is therefore also possible to create a surroundings model, which fits with another coordinate format.

The system may be equipped to ascertain absolute position information from the relative position information on the at least one object to be merged.

The system may be equipped to ascertain the absolute position information based on the distance and additional information with respect to the segment of road and/or the object to be merged if the relative position information is limited to the distance from the object to be merged. This additional information can be ascertained or detected by the following steps, for example:

Determining the type of object to be merged (e.g., traffic signs, other traffic participants), for example, by evaluating the sensor information (e.g., the camera unit) and/or the position information.

Calculating of several possible alternative points for the position of the object to be merged wherein when the distance between the vehicle and the object to be merged is known, the possible alternative points lie on a circle around the vehicle.

Using information known for different types of objects from the objects to be merged. Street signs, for example, are located at the edges of roads so that the edge of the road can be used as reference geometry for determining the geometry of the road. For vehicles as objects to be merged, for example, the lane dividing line may be a suitable reference geometry for determining the geometry of the road.

The information in a digital map format may be information in a path/offset format. The digital map format may be, for example, a path/offset format according to the ADASIS protocol. Driver assistance systems in motor vehicles often do not have enough memory to store a large digital map there. For this reason, one of the units and/or system in a vehicle will usually have a relatively large memory unit. Such a unit may be the navigation unit of the vehicle, for example. Depending on the instantaneous vehicle position, a relevant detail can be read out of the map from the memory unit and transferred in a predefined format to one of the driver assistance systems. This transfer may take place, for example, over a vehicle bus system or by means of other technologies such as shared memory, for example. Driver assistance systems that can receive this data can create a model of the surroundings from it, i.e., a so-called electronic horizon. This vehicle surroundings model and/or this electronic horizon contains only a portion of the total digital map, so this definitely reduces the demand for resources. ADASIS is a known protocol for such an information transfer and display. For transfer of information, this information is not transmitted as raw data, such as complete geographic coordinates, for example, but instead is transmitted in a special form of display.

The system may be equipped to determine an offset of the object to be merged by merging the information about the instantaneous position of the vehicle in a path/offset format and the absolute or relative position information of the object to be merged. The proposed system can merge relative or absolute position information with information in the path/offset format. First, the absolute position information of the at least one interface and/or the relative position information of the at least one sensor unit can be made available to the system. The navigation unit can provide information about the instantaneous position of the vehicle and about the segment of road in front of the vehicle in the path/offset format. The offset between the instantaneous vehicle position and the path/offset format and the relative or absolute position information of the object to be merged can be ascertained from the information provided.

The system may be equipped to ascertain one or more geometry points, whose absolute position information and/or whose position in the digital map format is/are known, by using the information provided by the at least one navigation unit for ascertaining the geometry of the road.

The system may be equipped to ascertain an offset of the object to be merged by using the geometry point(s) thereby ascertained. If there are numerous geometry points (high data density), a geometry point may in the simplest case be associated directly with the object to be merged. The geometry point at the shortest distance from the object to be merged may be used. In this case, the offset of the geometry point thereby ascertained may be used as the offset for the object to be merged. If the distance of the object to be merged from the nearest geometry point is greater than the predetermined threshold, there cannot be a direct association. If the distance between the geometry point and the object to be merged is greater than the predetermined threshold, then a neutral geometry point that is closer to the object to be merged can be determined by interpolation (or extrapolation) between two or more geometry points. Depending on the geometry of the road, the density of the geometry points G and the required precision, a linear method, a higher order polynomial or some other suitable method may be used for interpolation and/or extrapolation.

The absolute position information of the geometry point thereby ascertained may be known in world coordinates, and the course of the offset may also be known. For this reason, the offset of the object to be merged may correspond to the offset of the geometry point.

The system may be equipped to ascertain a node point by using the information made available by the at least one navigation unit for ascertaining the geometry of the road such that the absolute position information on this node point and/or its position in the path/offset format are known.

The system may be equipped to estimate the geometry of the segment of road between the object to be merged and the node point nearest to the object to be merged, wherein the system is further equipped to estimate the distance between the object to be merged and the node point based on the estimated geometry of the segment of road.

The system may be equipped to ascertain an offset between the node point and the object to be merged based on the estimated distance.

The system may be equipped to estimate the course of the segment of road based on at least one item of information detected by one or at least one sensor unit and/or based on at least one item of information or information provided by at least one interface. The following information may be included in the estimate:
- Evaluating the information from sensor units, such as the images of a camera unit, for example, with respect to the course of road markings, the position of detected objects relative to one another, etc.,
- Using distance and angle information from sensor units, such as the radar unit and/or lidar unit,
- Storing the vehicle trajectory driven recently, for example, by storing the GPS position(s),
- Using the steering angle and the vehicle speed, and
- Using node points from the digital map, from which the world coordinates are known.

The system may be equipped to ascertain whether the object to be merged is on the same path or in the same lane as the vehicle. In this way, there can be a correct association of path and lane of the object to be merged. If the object to be merged is on a different path or in a different lane, the offset must be corrected accordingly because each path has its own offset origin. The data from the digital map in the path/offset format and the data detected by the at least one sensor unit may be used for this purpose.

The system may be equipped to ascertain the information in the digital map format of an object to be merged, whose absolute position information is known, by means of a relative displacement vector starting from the instantaneous absolute position information on the vehicle.

As another alternative solution, a motor vehicle according to patent claim 15 is proposed, comprising a system according to any one of the preceding proposed solutions.

For another approach, a method for creating a surroundings model of a motor vehicle according to claim 16 is proposed. This method comprises the steps of: providing information about the instantaneous position of the vehicle and information about at least one segment of road in front of the vehicle in both time and space, wherein the information is supplied in a digital map format and/or in absolute position information, communicating with at least one object to be merged in the surroundings of the vehicle, wherein the received information comprises absolute position information on the at least one object to be merged, and/or detecting at least one object to be merged in the surroundings of the vehicle, wherein relative position information is supplied about the at least one object to be merged relative to the vehicle; ascertaining the geometry of a segment of road in front of the vehicle using the information about the segment of road in front of the vehicle, said information being supplied by the at least one navigation unit, merging the absolute position information and/or the relative position information about the at least one object to be merged with the information supplied by the at least one navigation unit in the digital map format to create a vehicle surroundings model based on the geometry of the road thereby ascertained.

The method may comprise the steps of: transforming the relative or absolute position information on the object to be merged into information in the digital map format and/or transforming the relative or absolute position information on the object to be merged and the information in the digital map format to a predefined coordinate format.

Absolute position information can be ascertained from the relative position information on the at least one object to be merged.

If the relative position information is limited to the distance from the object to be merged, then the absolute position information can be ascertained on the basis of the distance and additional information with respect to the segment of road and/or the object to be merged.

One or more geometry points whose absolute position information and/or whose position is/are known in the digital map format can be ascertained using the information supplied by the at least one navigation unit for ascertaining the geometry of the road.

The information in a digital map format may be information in a path/offset format.

An offset of the object to be merged can be ascertained by merger of the information about the instantaneous position of the vehicle in the digital map format and the absolute or relative position information on the object to be merged.

An offset of the object to be merged can be ascertained with the geometry point(s) that is ascertained.

At least one node point whose absolute or relative position information and/or whose position in the digital map format is/are known can be ascertained by using the information supplied by the at least one navigation unit for ascertaining the geometry of the road.

Of the segment of road between the object to be merged and the node point nearest the object to be merged can be estimated, wherein the distance between the object to be merged and the node point can be estimated based on the estimated geometry of the segment of road.

Based on the estimated distance, an offset can be ascertained between the node point and the object to be merged.

The course of the segment of road can be estimated based on information detected by at least one sensor or the at least one sensor unit and/or based on information provided by at least one interface or the at least one interface.

It is possible to ascertain whether the object to be merged is on the same path or in the same lane as the vehicle.

The information in the digital map format of an object to be merged whose absolute position information is known can be ascertained by means of a relative displacement vector starting from the instantaneous absolute position information on the vehicle.

BRIEF DESCRIPTION OF THE FIGURES

Additional details, features, advantages and effects of the method and devices described here can be derived from the following description of variants currently preferred as well as from the drawings, in which:

FIGS. 13 and 14 each show a diagram of a different possibility for merging data to create a vehicle surroundings model.

DETAILED DESCRIPTION OF THE DRAWINGS

Figure 1:
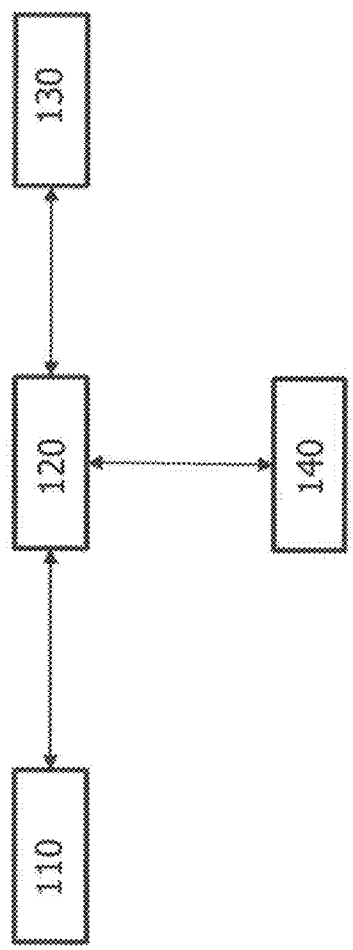
FIG. 1 shows a schematic diagram of a system for creating a surroundings model for a vehicle.

FIG. 1 shows schematically a sensor unit 110, a system 120, a navigation unit 130 and an interface 140, wherein the sensor unit 110, the system 120, the navigation unit 130 and the interface may be incorporated into a motor vehicle (not shown). The sensor unit 110, the navigation unit 130 and the interface 140 may be connected to the system 120, which is in turn connected to the navigation unit 130.

The sensor unit 110 may be, for example, a camera unit, a radar unit, a lidar unit or the like. However, the system 120 may also be connected to a plurality of sensor units 110, i.e., the system 120 may be connected to a camera unit, a radar unit and a lidar unit. The sensor unit 110 supplies relative position information on an object to be merged (not shown) in the surroundings of the vehicle to the system 120. If the sensor unit 110 is a camera unit, it may be a time-of-flight (TOF) camera unit. A time-of-flight camera can detect the surroundings of the vehicle in 3D based on the distance measurement method it carries out. A time-of-flight camera illuminates the surroundings of the vehicle with pulses of light, with the camera unit measuring the time needed by the light to travel to the object and back for each pixel. The required time is then used to determine the distance from the object detected. The sensor unit 110 can be additionally equipped to detect the course of a road border and/or a lane marking. Furthermore, the sensor unit 110 may be equipped to detect the width of the road.

The navigation unit 130 is equipped to supply information about the instantaneous position of the vehicle and at least one segment of road in front of the vehicle in time and space based on position information on the vehicle and/or map information. This information can be supplied in a digital map format. The navigation unit 130 may be equipped accordingly to ascertain the instantaneous position of the motor vehicle based on a signal, in particular a GPS signal. In addition, the navigation unit 130 may access map data in a digital map format stored in a memory in the navigation unit 130, supplied in the form of a external data medium and/or a Cloud system. The map data may also contain information about the course of the road border and/or the course of the lane marking and/or the width of the road. The current vehicle position can be supplied to the navigation unit 130 in a digital map format. The map data may also include information about the geometry of the road and the topology of the segment of road in front of the vehicle.

The interface 140 is equipped to communicate with at least one object to be merged in the surroundings of the vehicle. The information received by the interface 140 includes absolute position information on the at least one object to be merged. The interface 140 may also be an interface for the so-called "V2X" communication. V2X refers to the communication of a vehicle with objects. This expression thus includes communication of the vehicle with other vehicles, with infrastructure objects, but also with humans (pedestrians). Infrastructure objects may be, for example, traffic lights, traffic signs, mobile and stationary road surface borders, buildings, signs, billboards or the like.

The system 120 is equipped to ascertain geometry points and/or node points with known absolute position information and/or with known position information in the path/offset format from the information supplied by the navigation unit 130. With the geometry points and/or node points thereby ascertained, the system 120 can ascertain the geometry of the segment of road in front of the vehicle. The system is additionally equipped to merge the absolute position information and/or the relative position information on the at least one object to be merged with the information supplied by the at least one navigation unit 130 in a path/offset format based on the geometry of the road thereby ascertained in order to create a vehicle surroundings model. The map data may also include information about the course of the road border and/or the course of the lane marking and/or the width of the road.

Figure 2:
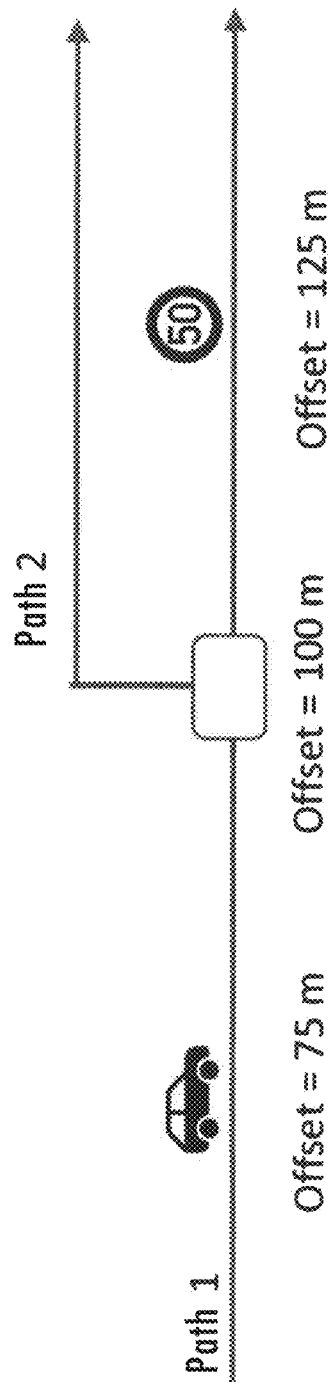
FIG. 2 shows an example of a view to illustrate a logic map format in path/offset format.

FIG. 2 shows a schematic diagram to illustrate the path/offset format for the position information about objects such as vehicles and traffic signs, nameplates and intersections in a digital map according to the ADASIS protocol. Roads are represented by paths and are labeled unambiguously by a path ID. For each path there is an offset value which is given in meters (or cm, mm, etc.) and thus defines the location of objects and additional information, for example, road curvature values and gradient values on the path. The current vehicle position is defined by means of path/offset information. Position information originating from a sensor unit such as a camera unit, a radar unit or a lidar unit in the vehicle, for example, is usually given in relative position information. The camera or radar, for example, may thus indicate that a relevant object and/or an object to be merged (e.g., traffic sign or another vehicle) is located at a certain distance from the vehicle. In contrast with that, data received via V2X technology is available as absolute position information (e.g., WGS84 world coordinates). For example, street lights can transmit the instantaneous switch status together with absolute position information in WGS84 format to street lights.

An embodiment of a method for creating a surroundings model of a vehicle, which can be carried out by the system 120, for example, is described below with reference to FIGS. 3 through 11. In the embodiment described below, merger of relative or absolute position information from various information sources with information in the path/offset format according to the ADASIS protocol will be explained. In this disclosure the position information from a digital map is referred to as information in the path/offset format or also as information in a digital map format. The path/offset format is an example of a digital map format.

Figure 3:
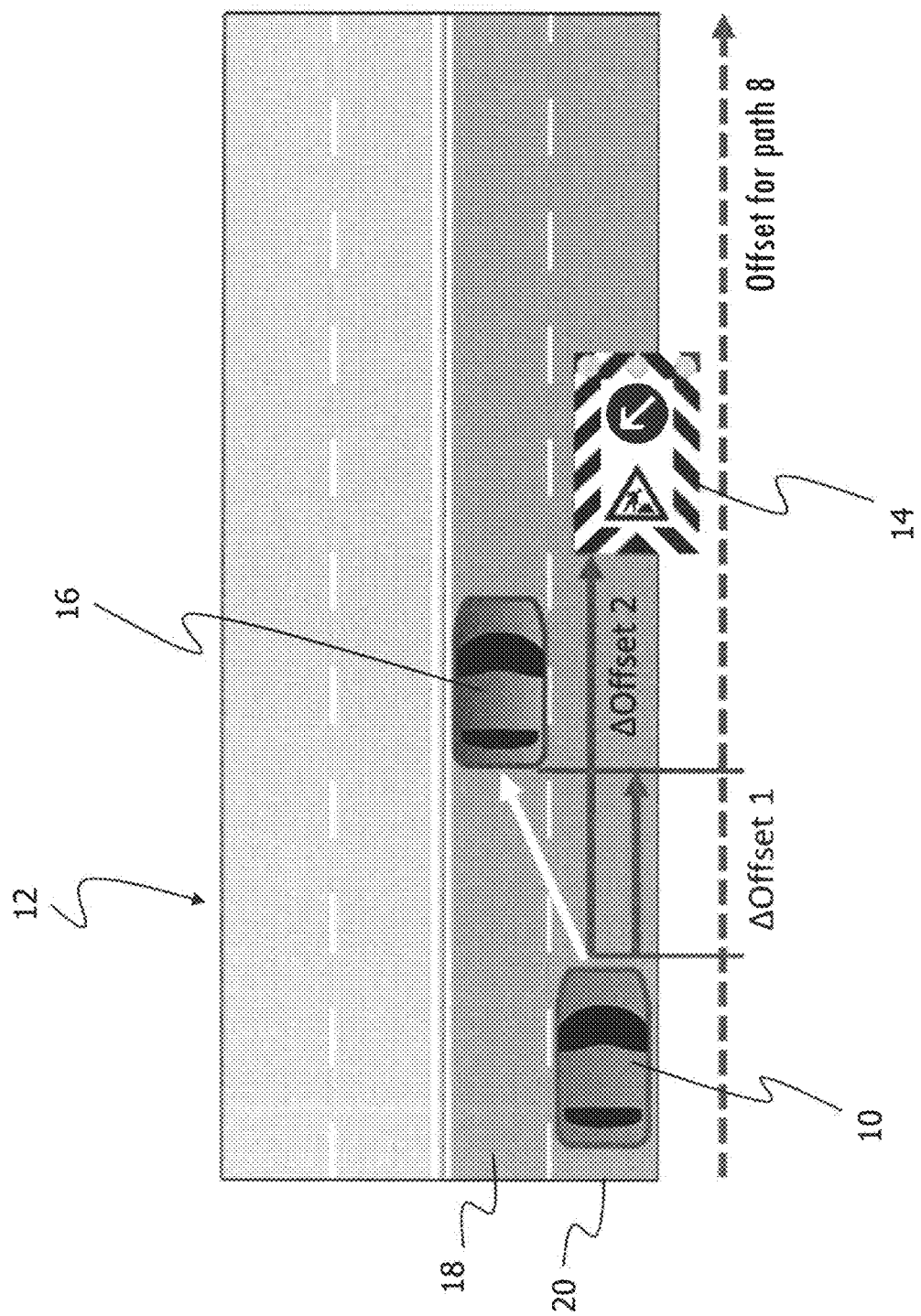
FIG. 3 shows an example of a diagram to illustrate the merger of information in the path/offset format with relative position information.

FIG. 3 shows an example of a diagram of merger of information in the path/offset format with relative position information. The ego vehicle 10 is driving on a road 12. The path ID 8 was assigned to the road 12 in the digital map. The offset for path 8 has a linear increase in the direction of the dashed arrow P. For example, a construction site 14 and a vehicle 16 in a lane 18 are detected by the camera unit and/or the radar unit (not shown) on the ego vehicle 10. The distance from the construction site 14 and the vehicle 16 can be determined from the camera and radar information. Furthermore, it is known from the camera and radar information which lanes 18 and 20 the objects 14 and 16 are in. For this reason the construction site 14 and the vehicle 16 as well as the ego vehicle 10 can be assigned to the path 8. The offset of the objects is obtained from the relative distance from the ego vehicle ΔOffset and the instantaneous offset value of the ego vehicle:

$$\text{Offset}_{object} = \text{Offset}_{ego\ vehicle} + \Delta\text{Offset}$$

The general procedure in merger of information in the path/offset format with relative position information was explained above. A prerequisite for merger according to the example shown in FIG. 2 is that the road must have little or no curvature. Merger of path/offset information with relative position information is described below without restriction to a certain course of the road.

Figure 4:
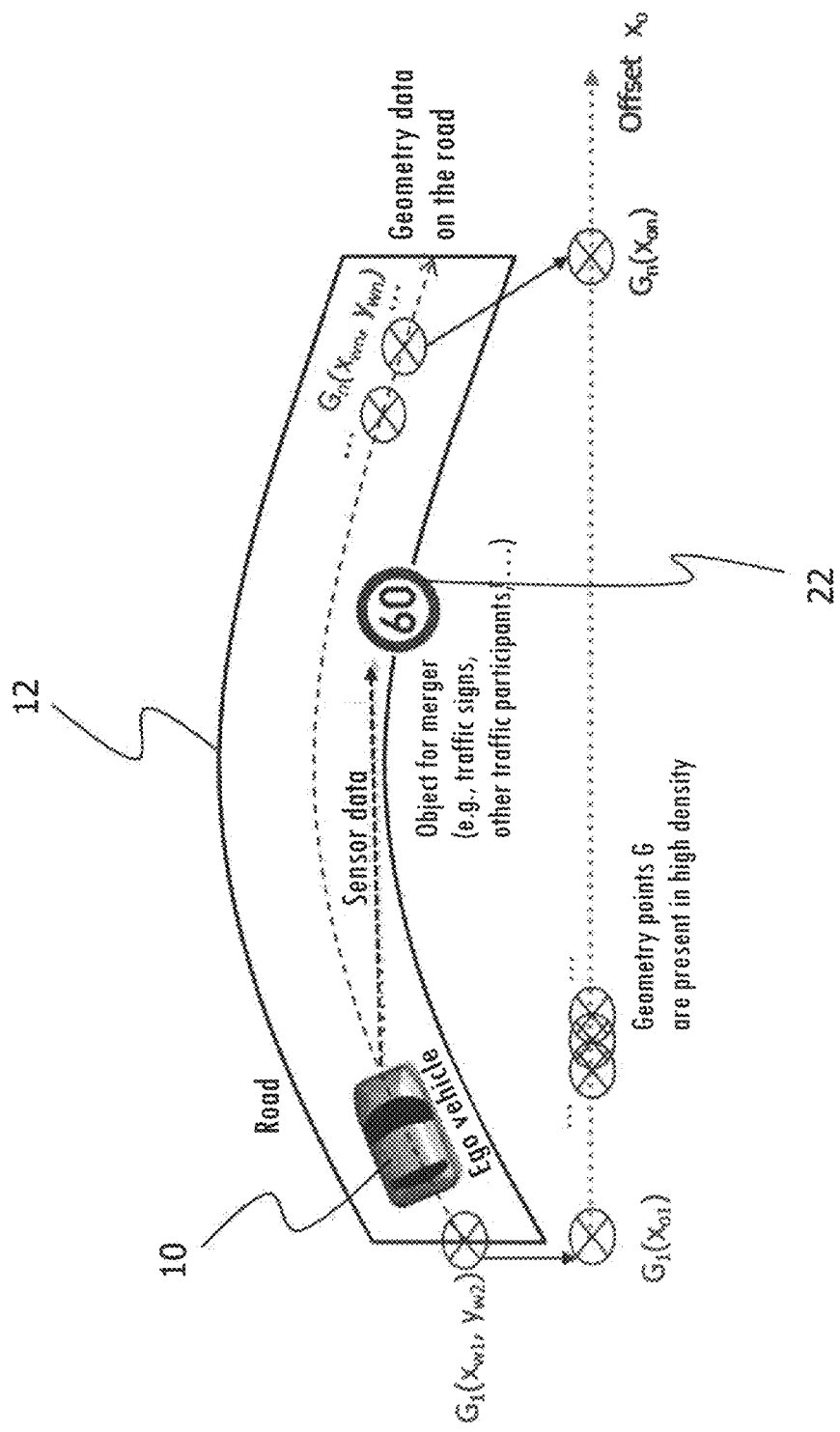
FIG. 4 shows another example of a diagram to illustrate the merger of information in the path/offset format with relative position information.

FIG. 4 shows another example of a diagram of a situation of the vehicle in which the merger of information in the path/offset format with relative position information is preferred. FIG. 4 shows the ego vehicle 10 on a road 12 which in this exemplary diagram has only a single lane. Unlike FIG. 2, the road 12 here is not straight but has a curvature. Intersections are a special case. At intersections, the direction of travel may change by 90° from the previous direction of travel. Again in the special case of intersections, the merger of information in the path/offset format with relative position information may take place according to the following description.

The ego vehicle 10 has a sensor unit (not shown) such as a camera unit or a radar unit, for example, that serves to detect objects to be merged such as the traffic sign 22 (speed limit 60 km/h). According to this example the traffic sign represents the object 22 to be merged. However, an object to be merged may also be another traffic participant, a street light, a traffic sign or pedestrians.

The sensor unit (not shown) can supply relative position information with only one coordinate with respect to the object 22 to be merged. This position information may be, for example, the distance of the object 22 relative to the ego vehicle 10 (e.g., object is 10 meters away). However, it is also possible for the sensor unit to supply more accurate position information with at least two coordinates. Such coordinates may be given, for example, in polar coordinates or Cartesian coordinates. The position information may then include a distance and an angle such as, for example, the object is 50 meters away at an angle of 5° to the direction of travel.

The variables shown in the following table are used.

| Symbol | Meaning |
| --- | --- |
| $x_w, y_w$ | World coordinates, e.g., WGS84 coordinates |
| $x_o$ | Offset coordinate on a path in a path/offset format |
| $x_{wo}, y_{wo}$ or $x_{oo}$ | World coordinates or offset coordinate of the object to be merged |
| O | Object point of the object to be merged (e.g., traffic sign) either in world coordinates $O(x_{wo}, y_{wo})$ or with offset coordinates $O(x_{oo})$ |
| G | Geometry point (e.g., lane marking) either in world coordinates $G(x_w, y_w)$ or with offset coordinate $G(x_0)$ |
| S | Node point for the merger (e.g., landmark) either with world coordinates $S(x_w, y_w)$ or with offset coordinate $S(x_o)$ |

The digital map may provide information with respect to the geometry of the road usually in absolute position information such as in world coordinates, for example. The geometry of the road includes, among other things, the geometry of the road markings and the geometry of lane markings. The geometry points G of a lane marking are shown in FIG. 4. Of the geometry points G, both the world coordinates $G(x_w, y_w)$ and the offset value on the respective path $G(x_o)$ are known. In the example according to FIG. 4, the information is available with a sufficiently high density, i.e., the distance between the individual points $G(x_w, y_w)$ is so small that a plurality of geometry points $G(x_w, y_w)$ is located in the immediate vicinity of the object 22 to be merged. The position information in world coordinates $E(x_w, y_w)$ from the ego vehicle 10 and the offset value $E(x_o)$ are also known.

The sensor unit detects the object 22 to be merged and represents its relative position information in relation to the ego vehicle 10 either one-dimensionally, specifying only the distance from the ego vehicle 10, or by more accurate position information, for example, the angle and distance in relation to the ego vehicle 10 and with a displacement vector.

First, absolute position information is ascertained from the relative position information on the object 22 supplied by the sensor unit. The absolute position information can be given in world coordinates. The world coordinates for the object 22 ($O(x_{wO}, y_{wO})$) are ascertained from the relative position information on the object 22. World coordinates are not usually given as Cartesian coordinates but instead are given as spherical coordinates in first approximation. The WGS84 model uses an oblate spheroid to describe the earth's surface. For a simpler illustration of merging, a spherical representation of the earth is assumed. This approximation is accurate enough for the short distances between the vehicle and the object for merger.

If the sensor unit supplies the angle α and the distance d from the object 22 to be merged, the result is the world coordinates of the object 22 ($O(x_{wO}, y_{wO})$) from the world coordinates of the ego vehicle $E(x_{wE}, y_{wE})$:

$$x_{wo} = \arcsin\left(\sin x_{wE} \cdot \cos\frac{d}{R} + \cos x_{wE} \cdot \sin\frac{d}{R} \cdot \cos\alpha\right)$$

$$y_{wo} = y_{wE} + \arctan 2\left(\sin\alpha \cdot \sin\frac{d}{R} \cdot \cos x_{wE}, \cos\frac{d}{R} - \sin x_{wE}\sin x_{wo}\right)$$

where d is the distance from the ego vehicle 10 to the object 22, α is the angle in the direction of the object 22, measured from the connecting line between the ego vehicle and the north pole and R is the radius of earth.

If the sensor unit supplies a displacement vector $\vec{v}=(a, b)$, then d and α must first be calculated from this vector. Next, $O(x_{wO}, y_{wO})$ can be determined using the equations given above. For example, the geometric relationships can yield the following:

$$d = \sqrt{a^2 + b^2}$$

$$\alpha = \alpha_F + \alpha_O$$

where $\alpha_F$ is the orientation of the ego vehicle (measured from the connecting line between the ego vehicle and the north pole) and $\alpha_O$ is the angle between the longitudinal axis of the ego vehicle 10 and the object 22. This angle is derived from the vector $\vec{v}$ thereby ascertained.

Figure 5:
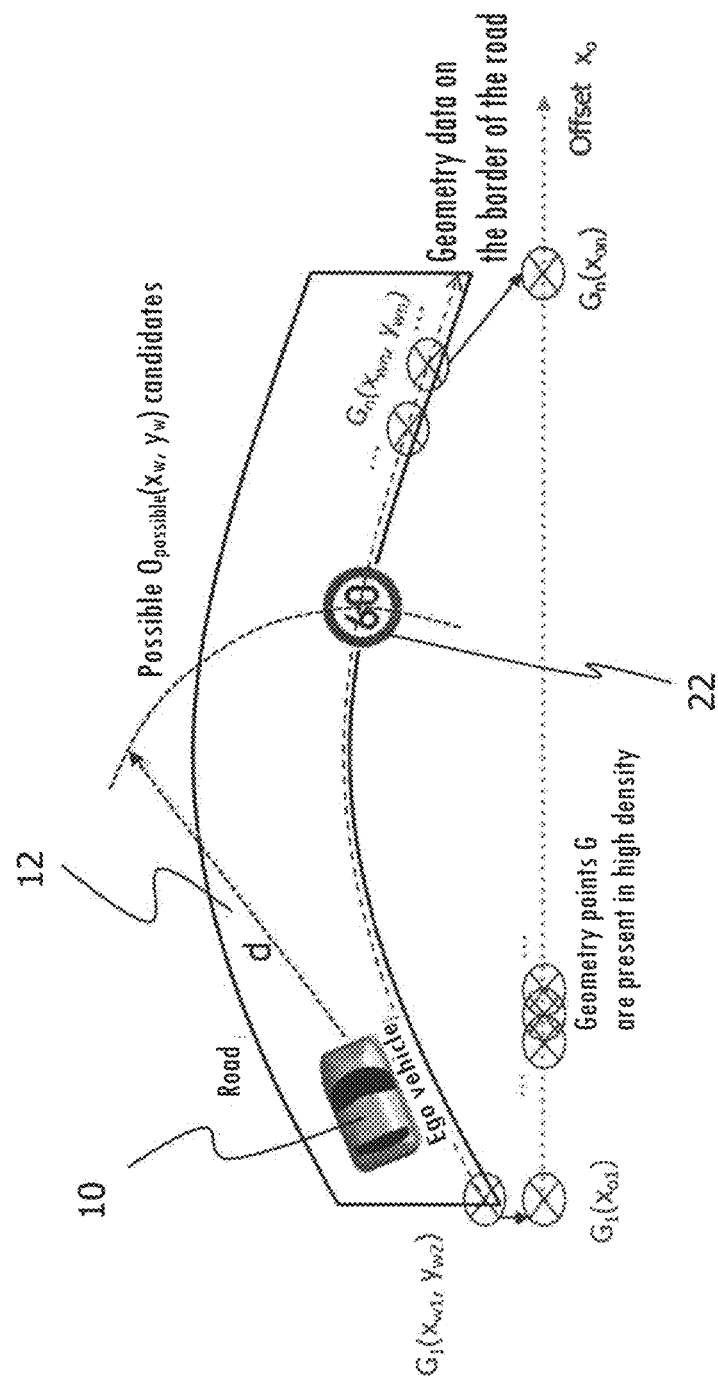
FIG. 5 shows an example of a diagram to illustrate the procedure in ascertaining absolute position information from the distance between the object to be merged and the vehicle.

FIG. 5 shows an example of a diagram to illustrate the procedure for ascertaining the absolute position information of the object 22 to be merged from the distance d between the ego vehicle 10 and the object 22 to be merged.

The sensor unit (not shown) supplies the distance d between the ego vehicle 10 and the object 22 to be merged, which is a traffic sign according to the example of a diagram in FIG. 5. Possible points $O_{possible}(x_w, y_w)$ for indicating the absolute position information of the object 22 lie on a circle around the ego vehicle 10 having the radius d, i.e., the radius corresponds to the distance d. It is possible to ascertain that the object 22 to be merged is a traffic sign based on the information ascertained from the sensor unit or the combination of information from a plurality of sensor units such as, for example, the combinations of information supplied by the radar unit and the camera unit. Since the object 22 to be merged is a traffic sign, the geometry of the road can be ascertained with the help of the geometry of the road border as a reference geometry. The geometry points $G(x_w, y_w)$ and $G(x_o)$ are known from the geometry of the road border. The absolute position information $O(x_{wO}, y_{wO})$ in world coordinates for the object 22 can be determined with the point of intersection of the curve having the radius d of all possible object points $O_{possible}(x_w, y_w)$ for the object 22 to be merged with the geometry of the road $G(x_w, y_w)$ thereby ascertained.

If, as described above, the absolute position information $O(x_{wO}, y_{wO})$ on the object 22 to be merged cannot be determined directly in world coordinates because of inadequate sensor information, then various types of additional information may be used to determine the best possible alternative point for the absolute position information on the object 22 to be merged. This additional information can be ascertained or detected by the following steps, for example:

Determining the type of object to be merged (for example, traffic signs, other traffic participants), for example, by evaluating the camera information and/or position information.

Calculating a plurality of possible alternative points for $O_{possible}(x_w, y_w)$. This was described above with reference to the example of a diagram according to FIG. 5, wherein the possible alternative points $O_{possible}(x_w, y_w)$ lie on a circle around the ego vehicle 10 (see FIG. 5) if the distance d from the object 22 to be merged is known.

Using known information for the different object types of objects to be merged. This includes, for example, information such as: street signs are located at the edges of lanes, so the edge of the road is best used as a reference geometry. When the object to be merged is another vehicle, the lane marking can be used as a suitable reference geometry for ascertaining the geometry of the road.

With the help of this information, a suitable alternative point is selected from the possible alternative points.

Figure 6:
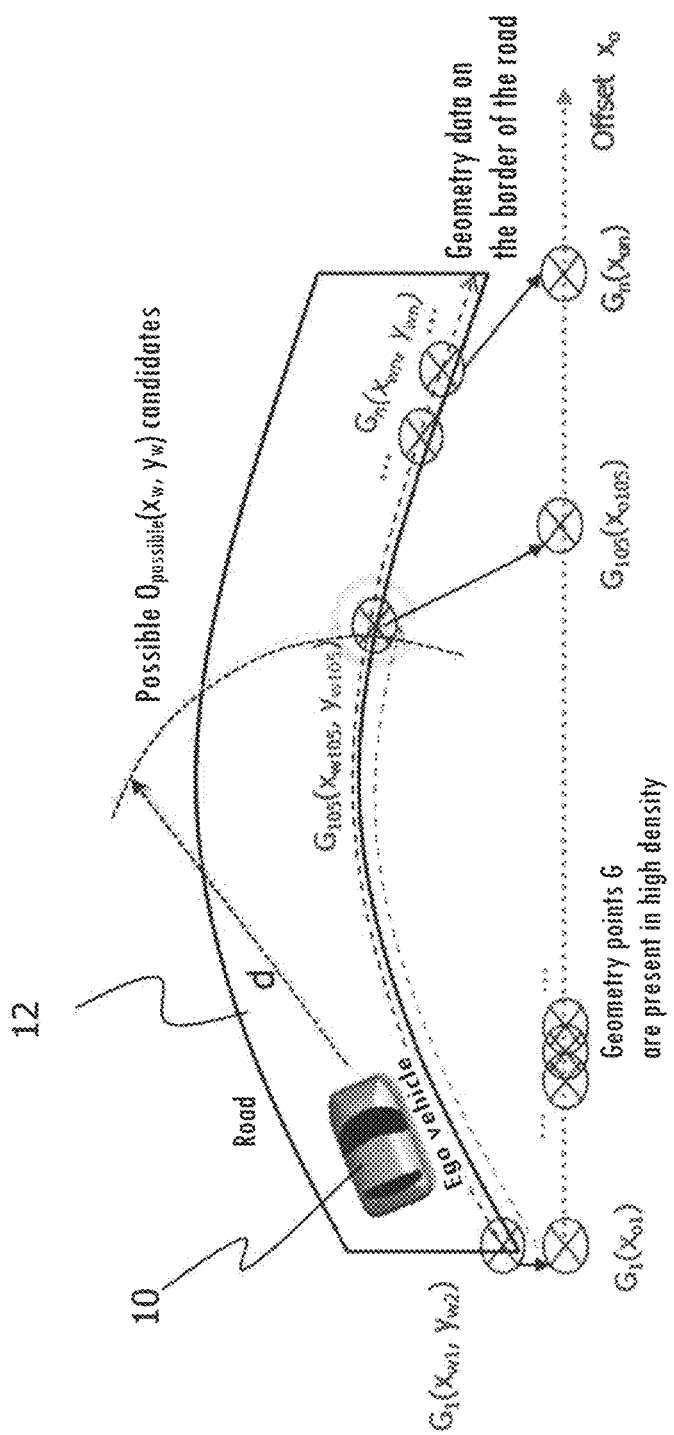
FIG. 6 shows an example of a diagram for ascertaining the offset of the object to be merged for the case when the geometry of the road is ascertained by using a plurality of geometry points.

FIG. 6 shows an example of a diagram for ascertaining the offset of the object 22 to be merged for the case when the geometry of the road is ascertained using a plurality of geometry points G whose absolute position information is known. The geometry points G having known absolute position information in this case are a short distance away from one another.

After calculating the absolute position information in world coordinates of the object to be merged $O(x_{wO}, y_{wO})$, for example, a suitable geometry point $G_{search}$ must be selected and must correspond to $O(x_{wO}, y_{wO})$ as well as possible. If they do correspond, then the geometry point G, which is the shortest distance away from $O(x_{wO}, y_{wO})$, for example, may be intended. If there is a large number of geometry points G (high data density), then in the simplest case, a geometry point G may be assigned directly to the object to be merged $O(x_{wO}, y_{wO})$:

$$O(x_{wO}, y_{wO}) = G_{search}(x_w, y_w)$$

If the distance of the object to be merged $O(x_{wO}, y_{wO})$ from the nearest geometry point G is greater than a predetermined threshold, then a direct correspondence cannot be found. In this case, a new geometry point $G_{interpol}(x_{wO}, y_{wO})$, which has a better correspondence with the object point O, may be determined by interpolation (or extrapolation) between two or more geometry points, so that it is then possible to determine:

$$O(x_{wO}, y_{wO}) = G_{interpolo}(x_w, y_w)$$

Depending on the course of the road geometry, the density of the geometry points G, the required precision and additional criteria, a linear method or a higher-order polynomial or some other suitable method may be used for interpolation and/or extrapolation. Because of the prerequisites described here, both the absolute position information in world coordinates $x_w, y_w$ and the course of the offset $x_o$ are known from the geometry point $G_{search}$. For this reason, the offset of the object 22 to be merged corresponds to the offset of $G_{search}$:

$$G_{search}(x_o) = O(x_{oo})$$

The offset of the object point O of the object to be merged is determined in this way. If an interpolated or extrapolated geometry point $G_{interpol}$ is used as the reference, then the offset for $G_{interpolo}$ must first be interpolated and extrapolated. The basis is one or more known neighboring geometry points of the geometry of the road. Then the following assignment can be made:

$$G_{interpol}(x_o) = O(x_{oo})$$

With reference to FIG. 6, the steps described above can be explained as an example. The geometry point $G_{105}(x_{w105}, y_{w105})$ has a good correspondence with the object 22 to be merged $(O(x_{wO}, y_{wO}))$; this is not shown in FIG. 6 in order to simplify the diagram, but it is in the position shown in FIG. 5. In other words, the position of the geometry point $G_{105}(x_{w105}, y_{w105})$ corresponds essentially to the position of the object 22 to be merged $(O(x_{wO}, y_{wO}))$ (see FIG. 5). For this reason, the offset $G_{105}(x_{o,105})$ of the geometry point $G_{105}(x_{w105}, y_{w105})$ can be associated with the offset of the object 22 to be merged $(O(x_{wO}, y_{wO}))$:

$$G_{105}(x_{o,105}) = O(x_{oo})$$

Figure 7:
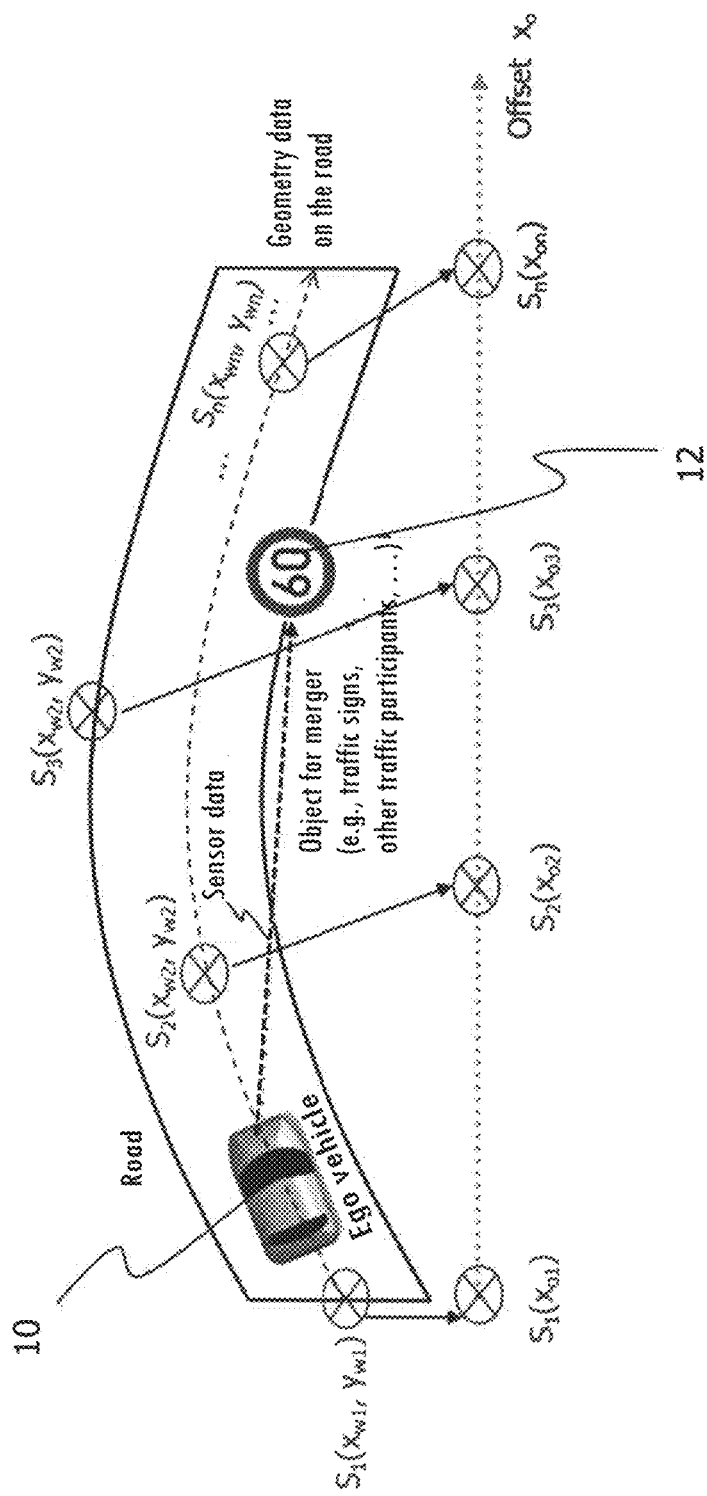
FIG. 7 shows an example of a diagram in which the geometry of the road is ascertained by using node points with known absolute position information.

FIG. 7 shows an example of a diagram, in which the road geometry is ascertained with the help of node points with known absolute position information. There may be cases in which the road geometry cannot be ascertained with geometry points. In these cases, there may be only a few geometry points with known absolute position information or none at all and/or the known geometry points may be too far apart from one another. In other words, the data density is so low that a simple interpolation or extrapolation method with the known geometry points cannot yield a sufficiently accurate result. Furthermore, it may happen that the data points cannot be interpolated or extrapolated. This is the case, for example, if there are no geometry points at all for the road or the lane but instead only absolute position information is available, for example, in world coordinates of objects such as traffic lights and other objects that are distributed irregularly.

Figure 8:
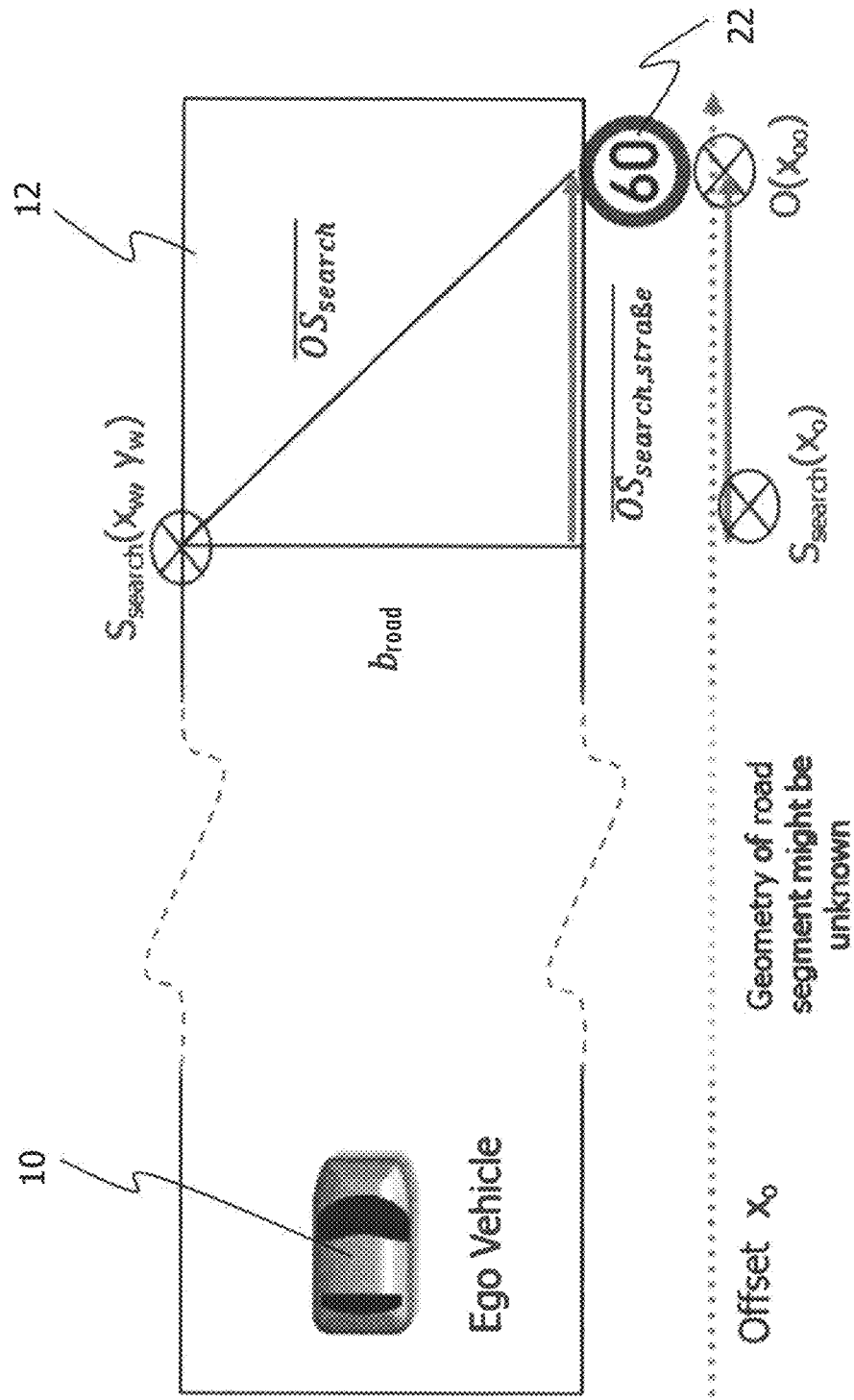
FIG. 8 shows an example of a diagram to illustrate the determination of the offset of an object to be merged by means of node points.

FIG. 8 shows an example of the starting situation in a merger with a low data density, i.e., with a few known geometry points and/or geometry points that are too far apart from one another. For example, the node points $S_1$, $S_2$ and $S_n$ may be geometry points on the road. The great distance between the node points $S_1$, $S_2$ and $S_n$ does not allow a reasonable interpolation. For example, the node point $S_3$ may be a landmark, a street light or a V2X-capable traffic sign, which can transmit their absolute position information.

Again in the present case, the absolute position information on the object to be merged $O(x_{wO}, y_{wO})$ can also be determined first in the present case if this is not known. This was already described in detail above.

After determination of the absolute position information on the object to be merged $O(x_{wO}, y_{wO})$, the node point $S_{search}(x_w, y_w)$ representing the smallest distance from the object $O(x_{wO}, y_{wO})$ can be found. In the example according to FIG. 8, The node point $S_3$ is selected for this purpose. The distance d from the object $O(x_{wO}, y_{wO})$ to the available node points is calculated by using the known world coordinates of the node points $S(x_w, y_w)$ and of the object $O(x_{wO}, y_{wO})$:

$$d = 2R \arctan2(\sqrt{a}, \sqrt{1-a})$$

$$a = \sin^2\left(\frac{\Delta x_w}{2}\right) + \cos x_{wo} \cos x_w \sin^2 \frac{\Delta y_w}{2}$$

For these equations, a spherical model of the earth with the radius R is assumed as the basis. Such a model of the earth is expected to meet the requirements for precision for most applications. If a greater precision is nevertheless required, other models of the earth (e.g., rotational ellipsoid) may be used. For many applications, it is sufficient if node points and objects in a Cartesian coordinate system are referenced in the surroundings of the ego vehicle 10. This is true in particular of node points and objects in a near circle around the ego vehicle 10. When using a Cartesian coordinate system, d is obtained from $$d = \sqrt{(x_{wO} - x_w)^2 + (y_{wO} - y_w)^2}$$

Which model of the earth and which coordinate system are used for reference in the node points and objects will depend mainly on the precision requirements of the respective application and also on the available resources (processor speed, memory, available computation time, etc.). The distance d between the object to be merged and $O(x_{wO}, y_{wO})$ and node point $S_n$ is an important criterion for selection of a suitable node point $S_n$. For example, the node point $S_n$ at the smallest distance from the object to be merged $O(x_{wO}, y_{wO})$ may be selected but other parameters can also have an influence on the choice of a suitable node point $S_n$. The node points $S_n$ may thus have one (or more) confidence indicators. This indicator may indicate, for example, how high the confidence is that the node point is actually located at the stored position. A high confidence is obtained, for example, by the fact that the position of the node point $S_n$ has been reported by an official authority (e.g., highway authority reports the position of a speed limit sign in world coordinates) or when the position of the node point $S_n$ has been confirmed by many different participants. If the confidence level is low, a node point for further processing can be ruled out, and a node point $S_n$ at a greater distance d but with a higher confidence may be selected. Either one or more confidence parameters supplied by a data provider may be used as the confidence interval. Furthermore, it is possible to calculate the confidence parameter before using the node point itself. For example, time stamps (e.g., the last confirmation of the position of the node point $S_n$), control parameters (e.g., variance of the measured node point position), type of data source (e.g., other traffic participants or public authority) and type of node point $S_n$ (e.g., traffic sign erected temporarily or permanently) may be used as input variables for calculating a confidence parameter.

Because of the low data density of the node points S, it is to be expected that the offset $O(x_{o,o})$ of the object to be merged $O(x_{wO}, y_{wO})$ cannot be deduced from the offset $S_n(x_o)$ of the selected node point S. An allocation of the offset of the selected node point S as an offset of the object to be merged $O(x_{wO}, y_{wO})$ is therefore impossible in most cases so that the following holds:

$$S_{search}(x_o) \neq O(x_{o,o})$$

FIG. 8 shows an example of a diagram for determining the offset of an object to be merged with node points S, where the road is straight in the diagram according to FIG. 8. To improve the precision of the offset determination of the object, it is necessary to estimate how the geometry of the road and thus how the offset runs along the road. If the road is straight between the node point $S_{search}$ and the object, then the offset $O(x_{o,o})$ of the object 22 to be merged can be calculated as follows by using the known distance $\overline{OS_{search}}$ between the object 22 to be merged and the node point $S_{search}$:

$$x_{o,o} = x_{o,S_{search}} + \overline{OS_{search}}$$

It may optionally be necessary to take into account the fact that the object 22 to be merged and the node point $S_{search}$ are not located on the same side of the road. In FIG. 7, for example, the node point $S_{search}$ is on the left side of the road, and the object 22 to be merged is on the right side of the road. In this case, the distance $\overline{OS_{search,road}}$ along the road must be calculated from geometric relationships. The required parameters for determining $\overline{OS_{search,road}}$ can be taken either from a database (e.g., the road width $b_{road}$ is stored in a digital map) or can be determined by means of vehicle sensors (e.g., determination of the road width $b_{road}$ by means of vehicle camera). In the case of a known road width and $\overline{OS_{search}}$ this yields:

$$\overline{OS_{search,road}} = \sqrt{\overline{OS_{search}}^2 - b_{road}^2}$$

In the case of $b_{road}$, this may involve other geometric variables in addition to the width of the road, such as the lane width or other distances that can be derived from the sensor information detected by the at least one sensor unit or from digital maps. Furthermore, the sensor units (for example, camera unit, radar unit) on the vehicle may be used to verify whether the prerequisites of a straight road course are met. If the road has a tight curve, the determination of $\overline{OS_{search,road}}$ will lead to an inaccurate result, as shown in FIG. 8. In this case it is necessary to determine the geometry of the road and thus the course of the offset along the road by means of an estimate based on the node points with known absolute position information and/or known information in the path/offset format. Mainly information from the vehicle sensors is therefore used as input. The road geometry between $S_{search}$ and the object to be merged can therefore be estimated, for example, with information from the at least one sensor unit. The at least one sensor unit may be a camera unit, for example. The course of the lane markings may be evaluated in the pictures taken by the camera unit. By way of support, for example, the steering angle and the vehicle trajectory that has been driven and recorded, for example, may be used. The remaining course of the road can thus be extrapolated from the course of the road that has been driven for a certain distance.

Figure 9:
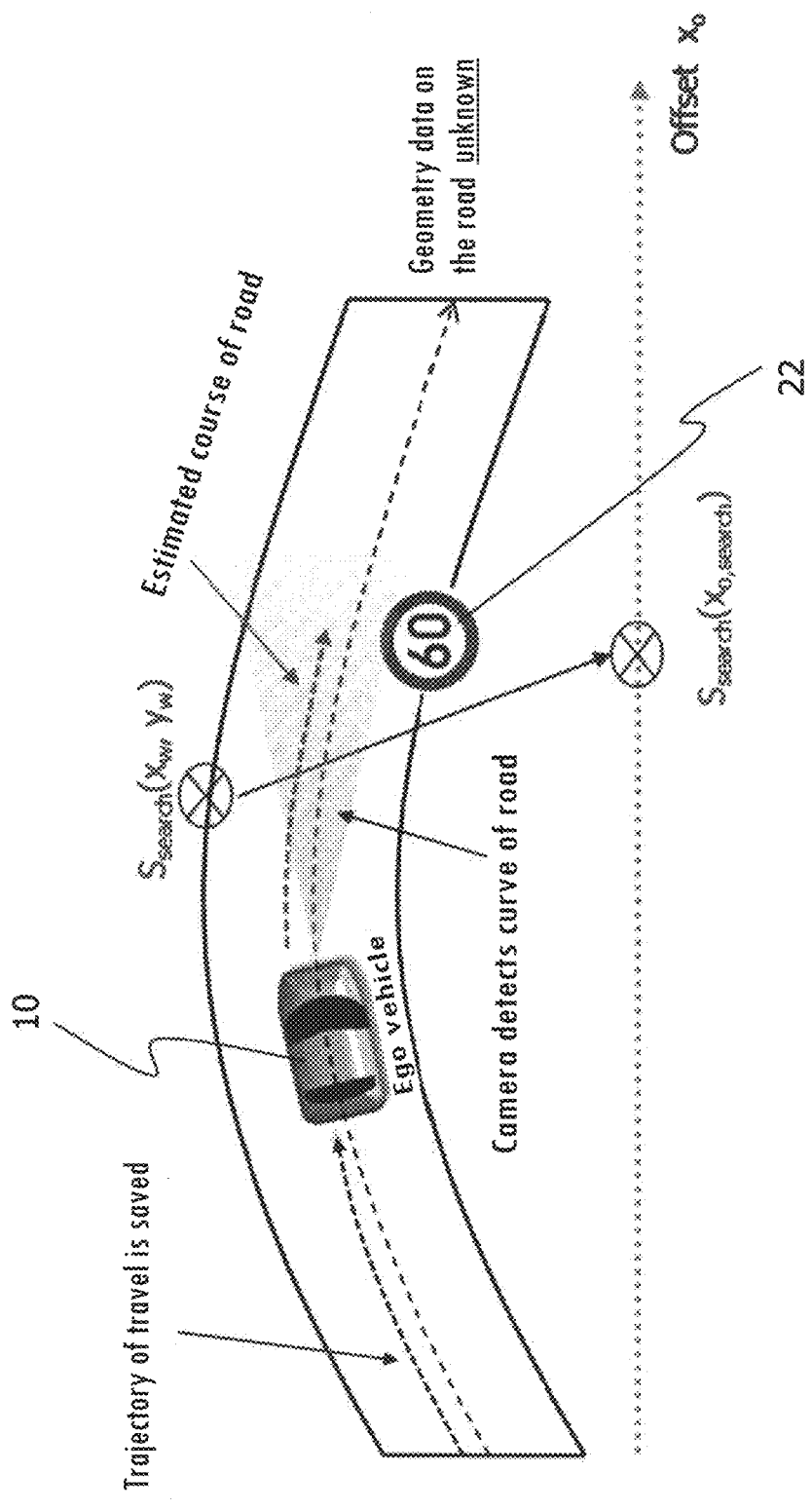
FIG. 9 shows an example of a diagram in which the road runs with a curve between the vehicle, the node point and the object to be merged.

FIG. 9 shows an example of a diagram, in which the road has a curvature between the ego vehicle 10, the node point $S_{search}$ and the object 22 to be merged. The road geometry between the ego vehicle 10 and the object 22 to be merged can be estimated with one or more sensor units of the ego vehicle 10 (camera unit, odometer, GPS, etc.). The distance between $S_{search}$ and the object 22 to be merged can therefore be estimated, so that the offset $O(x_{o,o})$ of the object 22 to be merged can be calculated as follows:

$$x_{o,o} = x_{o,S_{search}} + \overline{OS_{search,road,estimated}}$$

The most precise possible method of determining $\overline{OS_{search,road,estimated}}$ is particularly important to achieve the required precision. The following information can enter into the estimate, for example:
- Evaluating the camera images, e.g., with respect to the course of the road markings, position of detected objects relative to one another, etc.,
- Using distance information and angle information from sensor units such as the radar unit and/or the lidar unit,
- Storing the vehicle trajectory driven recently, for example, by storing the GPS position data,
- Using the steering angle and the vehicle speed, and
- Using node points from the digital map, for which the world coordinates are known.

Figure 10:
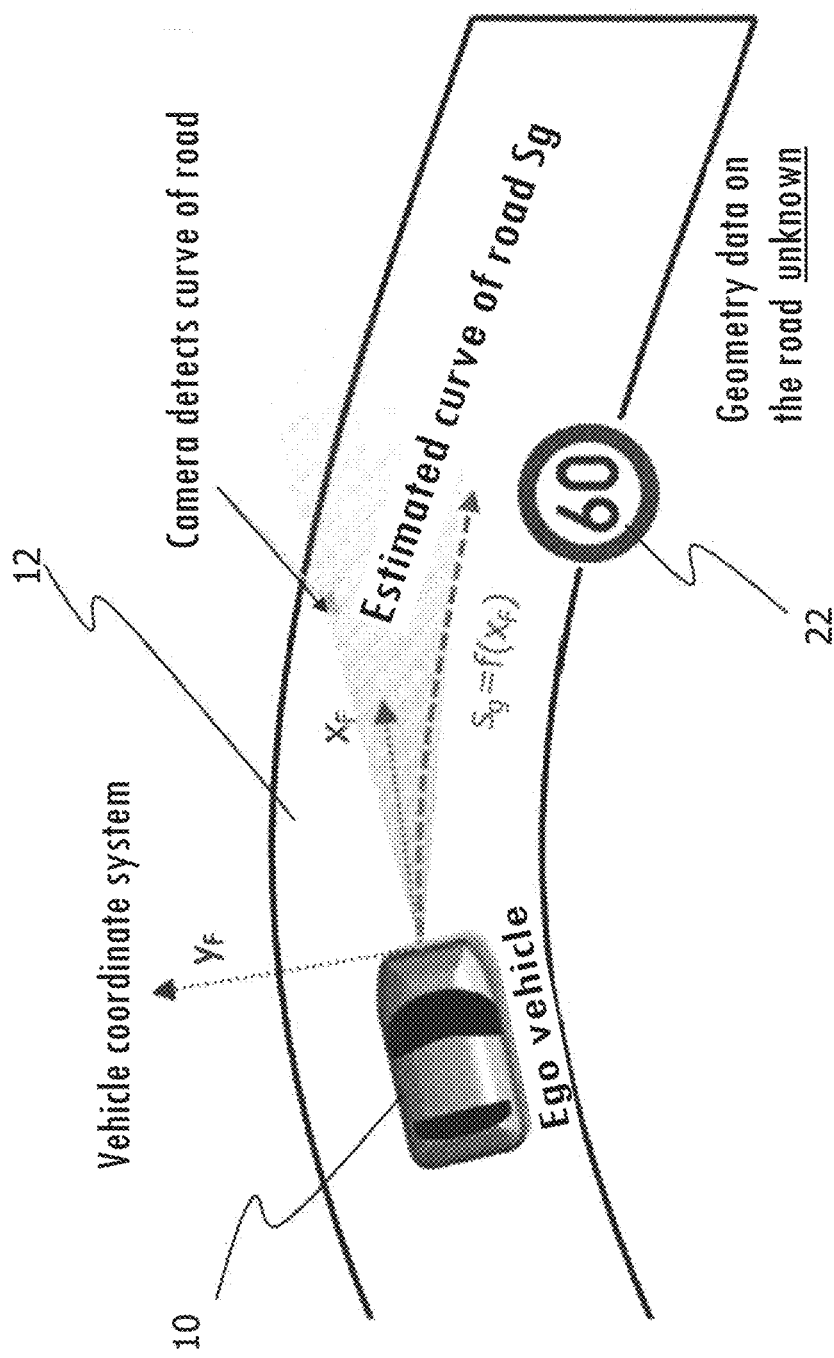
FIG. 10 shows an example of an estimated road geometry and/or an estimated course of the road.

FIG. 10 shows an example of an estimated road geometry and/or an estimated course of the road. If the geometry of the road can be estimated, the offset difference ΔOffset between the ego vehicle 10 and the object 22 to be merged (or between the node point $S_n$ and the object 22 to be merged) is obtained as follows:

$$\Delta \text{Offset} = \int_a^b ds$$

where a denotes the starting point of the path integration (e.g., node point, vehicle) and b denotes the location of the object 22 to be merged. For the solution to this problem, different coordinate systems (e.g., Cartesian, polar coordinates) may be used. The choice of the coordinate system depends on the respective conditions, i.e., in particular, which input parameters can be used to estimate the course of the geometry of the road.

As shown in FIG. 10, the camera unit (not shown) of the ego vehicle 10 detects the surroundings of the vehicle, in particular the surroundings in front of the vehicle. The geometry of the road and/or the course of the road are to be estimated with the help of the information detected by the camera unit. The estimate can be obtained, for example, by evaluation of the lane markings in the camera images. In this arrangement, it is advisable to give the estimated path of the road 12 $s_g$ as a function of the longitudinal coordinate $x_F$ in the Cartesian vehicle coordinate system:

$$s_g = f(x_F)$$

In the present case, this yields:

$$\Delta \text{Offset} = \int_0^b \sqrt{1 + \left(\frac{ds_g}{dx}\right)^2} \, dx$$

If the distance d and angle α of the object 22 to be merged from the ego vehicle 10 are known (e.g., from the information from at least one sensor unit, such as the radar unit), then the following holds for b in the vehicle coordinate system:

$$b = d \cos \alpha$$

Figure 11:
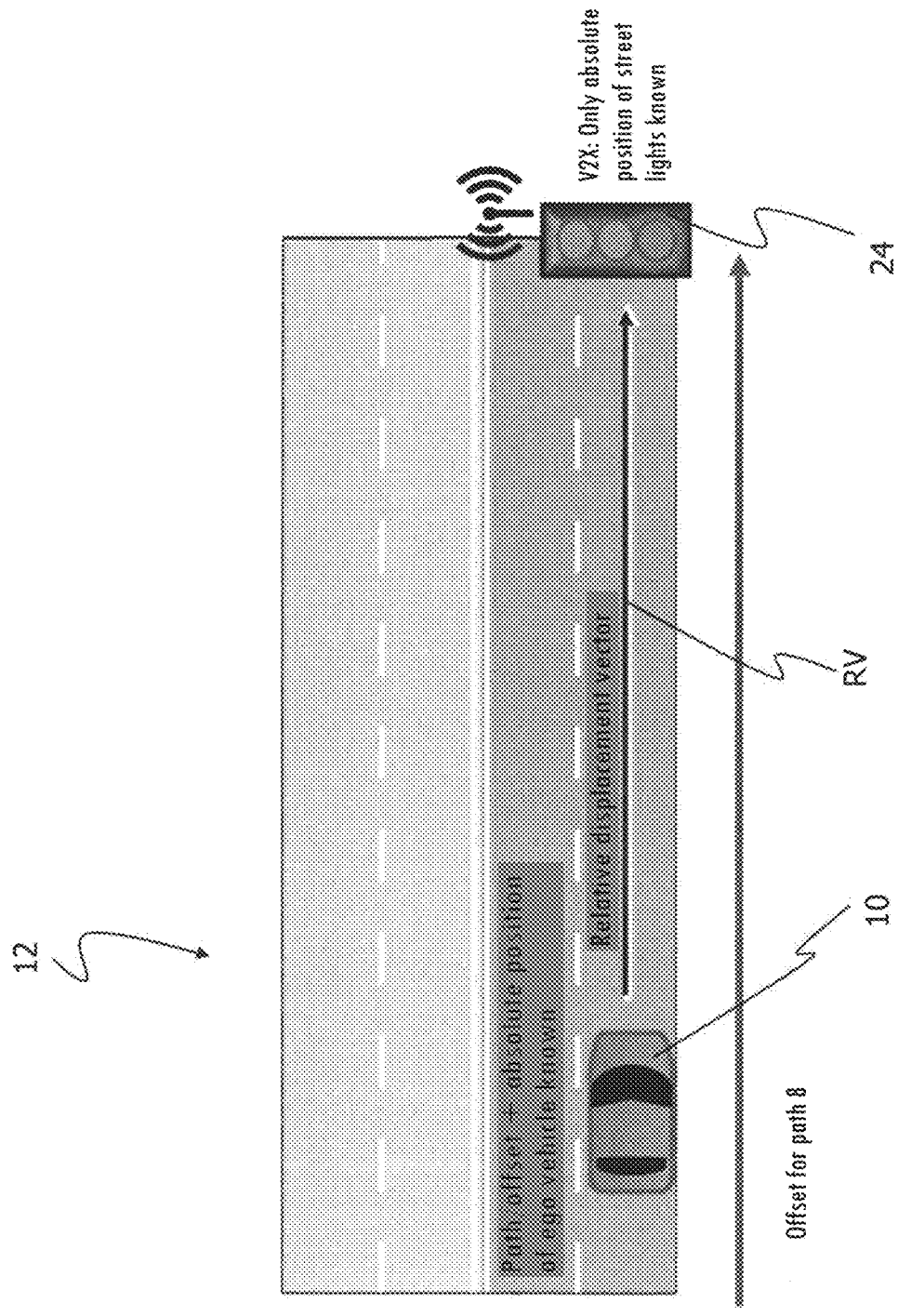
FIG. 11 shows an example of a diagram to illustrate how the position information is ascertained in the path/offset format on the example of a traffic light system with known absolute position information.

FIG. 11 shows how the position information is ascertained in the path/offset format on the example of a traffic light system having known absolute position information. The traffic light system 24 represents the object to be merged. This is mostly absolute position information in the case of position information transmitted from a V2X base station to the vehicle, for example. Thus, for example, a traffic light system transmits the instantaneous switch status together with its absolute position information to the traffic light 24 in WGS84 coordinates, i.e., in world coordinates. For the merger of absolute position information with position information in path/offset format, the instantaneous absolute vehicle position (or some other suitable reference) is used. The absolute position information on the vehicle 10 is known from the GPS receiver in the vehicle 10, for example. Likewise, the position of the vehicle in the path/offset format (e.g., ADASIS) is also known.

The path/offset display of the relevant object 24 (e.g., the traffic light system) can be found in different ways. In the simplest case, for example, when the distance between the vehicle and the relative object is small and when the course of the road is approximately straight, a relative displacement vector (vehicle 10 to the object 24 to be merged) can be calculated from the absolute position of the vehicle and the absolute position of the object 24 to be merged. The relative displacement between the vehicle 10 and the object 24 is thus known. It was explained above with reference to FIGS. 3 through 10 how the position information is determined from known absolute position information in the path/offset format.

Both the position information in the path/offset format and the absolute position information in world coordinates (WGS84 coordinates) are known by the ego vehicle 10. The relative displacement vector between the ego vehicle 10 and the traffic light system 24 can be calculated from these world coordinates of the ego vehicle 10 and the traffic light system 24 which represents the object to be merged. This vector can then be used to calculate the position information of the traffic light system in the path/offset format from the position information in the path/offset format of the ego vehicle 10. After calculating the position information in the path/offset format, the traffic light system can be inserted into a surroundings model of the vehicle. This vehicle surroundings model may be an electronic horizon (e.g., according to the ADASIS protocol), for example.

Figure 12:
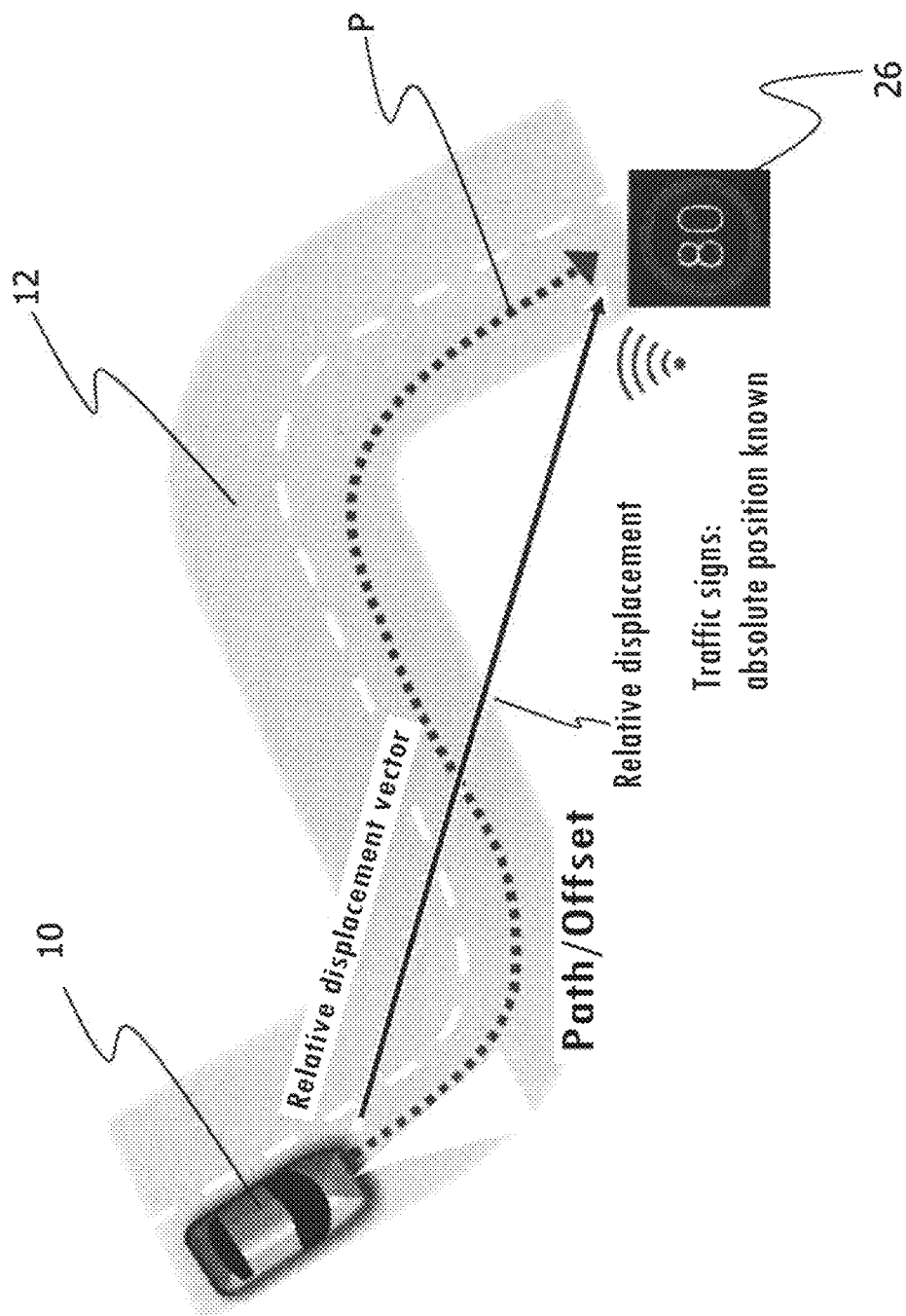
FIG. 12 shows an example of a diagram to illustrate the problems in merger of position information in the path/offset format with absolute position information in the case of a curved road course.

FIG. 12 shows an example of a diagram to illustrate the problems in merger of position information in the path/offset format and absolute position information with a curved course of the road. When the course of the road is curved, a displacement vector between the ego vehicle 10 and the relevant object or the object 26 to be merged can be calculated. However, if this is then added to the offset value of the ego vehicle 10, the results is a false value of the offset (and possibly of the path) of the object 26 to be merged because the offset value of the road does not follow the displacement vector (see FIG. 10). The actual offset course corresponds to the path integral along the arrow P, which is a dashed line in FIG. 11, as described above. The additional procedure then corresponds to the merger of the absolute position information with position information in the path/offset format, as described above. To avoid repetition, reference is made to the detailed description of FIGS. 3 through 10 given above.

FIGS. 13 and 14 show which merger possibilities are created by the present disclosure in order to be able to create a vehicle surroundings model. The examples described above relate to merging relative position information and absolute position information (in relative and world coordinate formats) with position information in a logic map display (path/offset format). This is shown in FIG. 13. The position information detected by a sensor unit of the vehicle may be information from a camera unit and/or a radar unit, for example. The logic map display may be an electronic horizon according to the ADASIS protocol, for example. The embodiments described above thus relate to among other things the integration of relative or absolute position information into a digital horizon. For the ADAS/AD applications, this yields the advantage that a uniformed and merged surroundings model is created regardless of the source of the position information.

In addition to this approach, as shown in FIG. 14, it is also possible not to integrate the relative or absolute position information into the electronic horizon but instead to merge the relative and/or absolute position information and the position information from the electronic horizon (in the path/offset format) to yield an additional vehicle surroundings model with a different coordinate system. In the merger according to FIG. 14, relative and/or absolute position information and the position information on the electronic horizon (in the path/offset format) are merged into an additional surroundings model, which uses a different coordinate system than the electronic horizon in the path/offset. This may be, for example, a Cartesian coordinate system or a polar coordinate system which is also moved along with the ego vehicle. The merger of position information disclosed here and described above includes the two possibilities according to FIGS. 13 and 14. When used according to FIG. 14, the same steps must be carried out first, as in the embodiments described above. After these steps, the merged position information can be transferred to another coordinate system (for example, a Cartesian coordinate system and/or a polar coordinate system).

According to the embodiment of the method for creating a surroundings model of a vehicle as described with reference to FIGS. 1 through 12, either relative position information relative to the ego vehicle or absolute position information (world coordinates, e.g., WGS84 coordinates) is merged with information in the path/offset format. Due to this merger of information, for example, the following information can be integrated into an electronic horizon and/or into a surroundings model of the vehicle:

Information about the instantaneous condition of traffic light systems. With the merger of information as described here, it is possible to merge real-time updates about the switch status of the traffic light system originating from a V2X data source with the position information from the traffic light system which originates from a digital map. Only by merger of such information can real-time information be merged with static data from a digital map. Without such a merger, it is impossible to determine how the real-time information can be correlated with objects in the electronic horizon. With this correlation, a (self-driving) vehicle can respond appropriately to the respective traffic light.

Information about the instantaneous condition of variable speed displays (e.g., LED speed displays on highways). What was said above also applies here with respect to the real-time data of traffic light systems. Without merger of information, the real-time data on the speed limits received by V2X, for example, cannot be correlated with the static objects from the digital map and/or the electronic horizon.

Information about the location and speed of other traffic participants (e.g., other vehicles, pedestrians, etc.). Merger of information makes it possible to integrate the positions of the other traffic participants into the digital horizon. Therefore information from the digital map as well as information from the vehicle sensors are available in a shared surroundings model. This results in a better evaluation of the situation with regard with many ADAS/AD functions.

Information about recent changes in road courses (e.g., at construction sites). For example, the course of the altered lane guidance at a construction site can be transmitted by V2X to the vehicle. By merger of information, this information can be integrated into the digital horizon.

Information about traffic obstacles (e.g., accidents, road blocks). In this context it may be helpful to integrate the position information from different sources into a shared electronic horizon.

Figure 15:
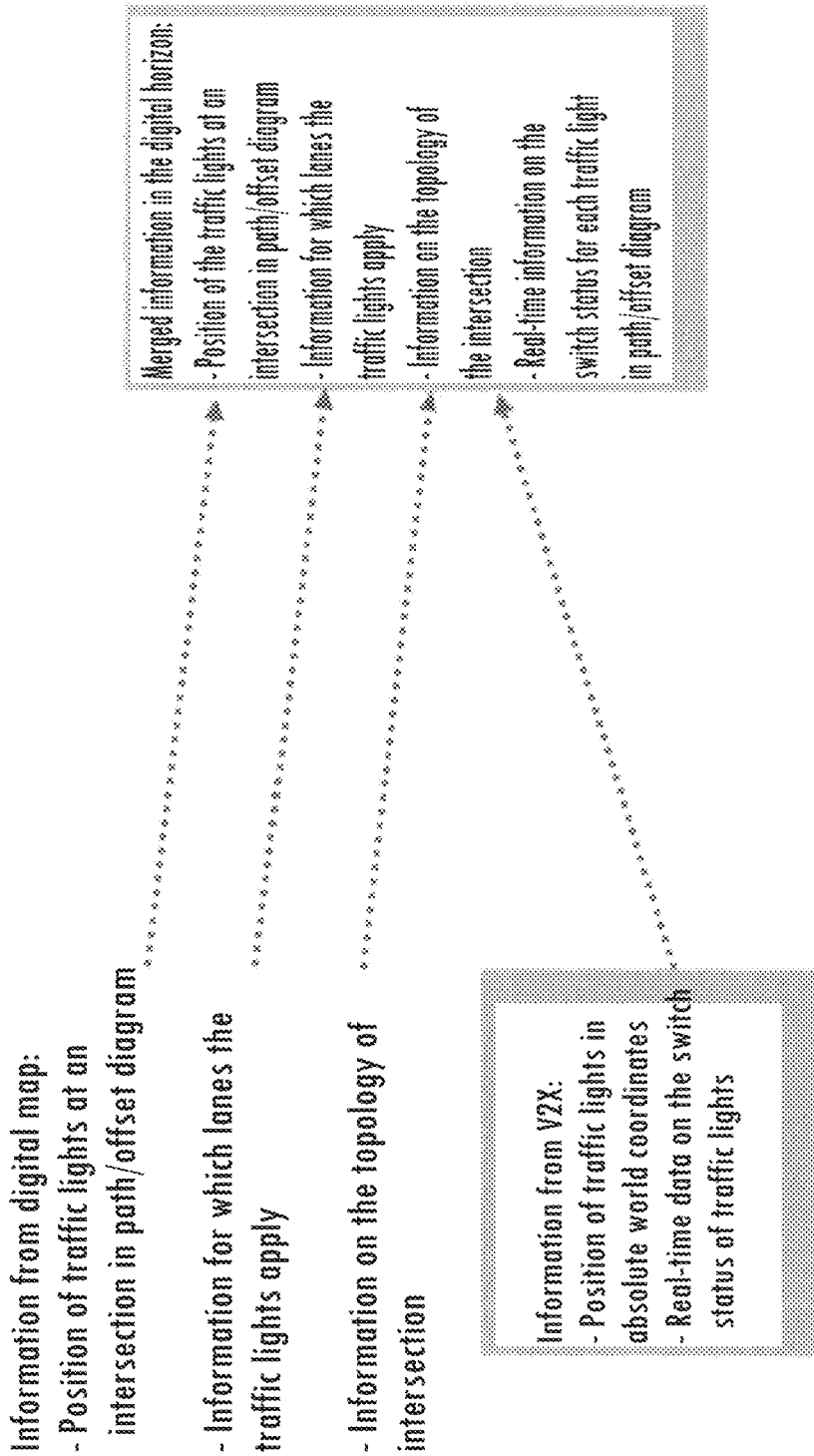
FIG. 15 shows a diagram to illustrate the advantages of a vehicle surroundings model with merged position information.

FIG. 15 shows the advantages of merger of information from different information sources on the basis of the example of a traffic light system. Without the integration and correlation of the data from different sources, for example, the digital map, the vehicle sensors and V2X data sources, a uniform surroundings model is not obtained. It is impossible to correlate the same objects from different data sources and combine their information.

By integrating these different types of information into a surroundings model (e.g., ADASIS), it is possible to implement the following applications in the ADAS/AD range, for example:

Warning the driver of hazardous sites or traffic obstacles along the path traveled. Due to the merger of information it is possible to ascertain whether the hazardous locations are on the path currently being driven and whether these are relevant for the vehicle.

Taking into account information about the instantaneous condition of traffic lights and information about variable speed limits in the choice of speed for an intelligent cruise control (e.g., green ACC). Through merger of information, the real-time data from sources such as V2X cannot be merged and correlated with the other objects (traffic lights, traffic signs) from a digital map to form a shared surroundings model and/or horizon. Without this correlation, the information received from a V2X data source cannot be interpreted.

Displaying information about the instantaneous traffic light condition and information about variable speed limits on a human-machine interface (HMI) in the vehicle. By merging information, it is possible to correlate and interpret data from different sources in a shared surroundings model.

Choosing an alternative route due to traffic obstacles. Through merger of information it is possible to determine whether the traffic obstacle is relevant for the vehicle.

The variants of the method or the devices described above as well as their functional aspects and operational aspects serve only to provide a better understanding of the structure, functioning and properties. They do not limit the disclosure to these embodiments. The figures are partially drawn schematically with a definite emphasis on important properties and effects in some cases to illustrate the functions, active principles, technical embodiments and features. Any functioning, any principle, any technical embodiment and any feature which is/are disclosed in the figures or text may be combined freely and at will with any claims, any feature in the text and/or in the other figures, other functioning, principles, technical embodiments and features contained in this disclosure or derivable therefrom so that all conceivable combinations can be attributed to and associated with the methods and/or devices as described. This also includes combinations of all the individual embodiments in the text, i.e., in any section of the description, the claims and also combinations of different variants in the text, the claims and the figures. For the value ranges given here, it holds that all numerical values in between are also disclosed.

The claims also do not limit the disclosure content and thus the possible combinations of all the features presented here among one another. All the features disclosed are also disclosed explicitly individually and in combination with any other features.

The invention claimed is:

1. A system for creating a surroundings model for a vehicle, the system comprising:
at least one navigation unit configured to provide instantaneous position information for the vehicle and road segment information about at least one segment of road in front of the vehicle in time and space, wherein the navigation unit provides the road segment information in a digital map format, the road segment information comprising course information about a course of one of a road border and a lane marking of the at least one segment of the road;
at least one sensor unit configured to detect at least one object and to provide relative position information indicative of a distance between the vehicle and the at least one object,
wherein the system is configured to ascertain a geometry of the at least one segment of the road in front of the vehicle based on the course information, the geometry of the at least one segment of the road comprising geometry points distributed and representative of one of the road border and the lane marking, each geometry point comprising absolute position information,
wherein the system is configured to merge absolute position information for the at least one object with information provided by the at least one navigation unit in the digital map format to create a vehicle surroundings model, the merging comprising:
identifying a plurality of alternative points for the at least one object based on the relative position information, the plurality of alternative points being located on a circle around the vehicle, the circle having a radius that corresponds to a distance from the vehicle to the at least one object;
identifying a respective alternative point of the plurality of alternative points for the at least one object based on an evaluation of the plurality of alternative points and geometry points, wherein the respective alternative point comprises absolute alternative point information corresponding to the absolute position information for the at least one object; and
creating the vehicle surroundings model based on the geometry of a road and the absolute position information for the at least one object, where the vehicle surroundings model includes at least one object model representative of the at least one object, and
wherein the vehicle is controlled based on the vehicle surroundings model.

2. The system according to claim 1, wherein the system is configured to transform the relative or absolute position information on the at least one object to be merged into information in the digital map format and/or wherein the system is configured to transform the relative or absolute position information on the at least one object to be merged and the information in the digital map format into a predefined coordinate format.

3. The system according to claim 2, wherein the system is configured to ascertain the absolute position information based on a distance and additional information with respect to the segment of road.

4. The system according to claim 1, wherein the system is configured to ascertain geometry points whose absolute position information and/or whose position in the digital map format are known by using the information provided by the at least one navigation unit for ascertaining the geometry of the road.

5. The system according to claim 1, wherein the system is configured to ascertain an offset of the at least one object to be merged by merging instantaneous position information for the vehicle in the digital map format and the absolute or relative position information for the at least one object to be merged.

6. The system according to claim 5, wherein the system is configured to ascertain the offset of the at least one object to be merged by using a respective geometry point thereby ascertained or the geometry points thereby ascertained.

7. The system according to claim 1, wherein the system is configured to ascertain at least one node point whose absolute or relative position information and/or whose position in the digital map format is/are known by using the course information provided by the at least one navigation unit for ascertaining the geometry of the road.

8. The system according to claim 7, wherein the system is configured to estimate the geometry of the segment of road between the at least one object to be merged and the at least one node point closest to the object to be merged, wherein the system is further configured to estimate a distance between the at least one object to be merged and the at least one node point based on the estimated geometry of that segment of road.

9. The system according to claim 8, wherein the system is configured to ascertain an offset between the at least one node point and the at least one object to be merged based on the estimated distance.

10. The system according to claim 8, wherein the system is configured to estimate the course of the segment of road based on information detected by at least one sensor unit and/or based on information provided by at least one interface.

11. The system according to claim 1, wherein the system is configured to ascertain whether the at least one object to be merged is located on a same path or in a same lane as the vehicle.

12. The system according to claim 1, wherein the system is configured to ascertain information in the digital map format of an object to be merged whose absolute position information is known by means of a relative displacement vector starting from the instantaneous absolute position information on the vehicle.

13. A vehicle comprising a system according to claim 1.

14. The system according to claim 1, wherein a driver assistance system is configured to access the vehicle surroundings model for controlling the vehicle.

15. The system according to claim 1, wherein the system is a driver assistance system.

16. A method for creating a surroundings model of a vehicle, wherein the method comprises the steps:
providing instantaneous position information for the vehicle and road segment information about at least one segment of road in front of the vehicle in time and space, wherein the road segment information is provided in a digital map format and comprises course information about a course of one of a road border and a lane marking of the at least one segment of the road;
detecting at least one object to be merged in a surroundings of the vehicle to provide relative position information for the at least one object indicative of a distance between the vehicle and the at least one object;
ascertaining a geometry of at least one segment of road in front of the vehicle based on the course information about the segment of road in front of the vehicle, the geometry of the at least one segment of the road comprising geometry points distributed and representative of one of the road border and the lane marking, each geometry point comprising absolute position information;
merging absolute position information for the at least one object with information provided by at least one navigation unit in the digital map format to create a surroundings model, the merging comprising
identifying a plurality of alternative points for the at least one object based on the relative position information, the plurality of alternative points being located on a circle around the vehicle, the circle having a radius that corresponds to a distance from the vehicle to the at least one object;
identifying a respective alternative point of the plurality of alternative points for the at least one object based on an evaluation of the plurality of alternative points and geometry points, wherein the respective alternative point comprises absolute alternative point information corresponding to the absolute position information for the at least one object;
creating the surroundings model based on the geometry of the road and the absolute position information for the at least one object, where the surroundings model includes at least one object model representative of the at least one object; and
controlling the vehicle based on the vehicle surroundings model.

17. The method according to claim 16, wherein the method comprises at least one of the steps:
transforming the relative or absolute position information on the at least one object to be merged into information in the digital map format and/or
transforming the relative of absolute position information on the at least one object to be merged and the information in the digital map format into a predefined coordinate format.

18. The method according to claim 17, wherein the absolute position information is ascertained based on additional information with respect to the segment of road and/or the at least one object to be merged.

19. The method according to claim 16, wherein the geometry points whose absolute position information and/or whose position in the digital map format are known are ascertained by using the information provided by the at least one navigation unit for ascertaining the geometry of the road.

20. The method according to claim 16, wherein an offset of the at least one object to be merged is ascertained by merging the instantaneous position information for the vehicle in the digital map format and the absolute or relative position information on the at least one object to be merged.

21. The method according to claim 20, wherein an offset of the at least one object to be merged is ascertained by using the geometry point thereby ascertained.

22. The method according to claim 16, wherein node points whose absolute or relative position information and/or whose position in the digital map format is/are known are ascertained by using the information provided by the at least one navigation unit for ascertaining the geometry of the road.

23. The method according to claim 22, wherein the geometry of the segment of road between the at least one object to be merged and a respective node point closest to the at least one object to be merged is estimated such that a distance between the at least one object to be merged and the respective node point is estimated to provide an estimated distance based on the estimated geometry of the segment of road.

24. The method according to claim 23, wherein an offset between a respective node point and the at least one object to be merged is ascertained based on the estimated distance.

25. The method according to claim 23, wherein the course of the segment of road is estimated based on information detected by at least one sensor unit and/or based on at least one item of information provided by at least one interface.

26. The method according to claim 16, wherein it is ascertained whether the at least one object to be merged is located on a same path or in a same lane as the vehicle.

27. The method according to claim 16, wherein the information in the digital map format of an object to be merged whose absolute position information is known is ascertained by means of a relative displacement vector starting from the instantaneous absolute position information on the vehicle.

* * * * *